US012718461B2

(12) United States Patent
Vainer et al.

(10) Patent No.: US 12,718,461 B2
(45) Date of Patent: Aug. 25, 2026

(54) GENERATING PHYSICALLY-BASED RENDERING (PBR) TEXTURES USING IMAGE-BASED DIFFUSION

(71) Applicant: Unity Technologies SF, San Francisco, CA (US)

(72) Inventors: Shimon Vainer, Bat-Yam (IL); Simon Johannes Donné, Tübingen (DE); Mark Benedikt Boss, Tübingen (DE); Mathias Parger, Graz (AT)

(73) Assignee: Unity Technologies SF, San Francisco, CA (US)

( * ) Notice: Subject to any disclaimer, the term of this patent is extended or adjusted under 35 U.S.C. 154(b) by 138 days.

(21) Appl. No.: 18/401,262

(22) Filed: Dec. 29, 2023

(65) Prior Publication Data

US 2025/0218103 A1 Jul. 3, 2025

(51) Int. Cl.
*G06T 15/04* (2011.01)
*H04N 13/351* (2018.01)
*H04N 19/597* (2014.01)

(52) U.S. Cl.
CPC ........... *G06T 15/04* (2013.01); *H04N 13/351* (2018.05); *H04N 19/597* (2014.11)

(58) Field of Classification Search
CPC ..... G06T 15/04; H04N 19/597; H04N 13/351
See application file for complete search history.

(56) References Cited

U.S. PATENT DOCUMENTS 11,158,121 B1 * 10/2021 Tung ...................... G06N 3/045
11,875,461 B2 * 1/2024 Staab ................ G06F 18/24133
2021/0144212 A1 * 5/2021 Lee .................... G06Q 10/0631
2022/0103797 A1 * 3/2022 Barbour ................. H04N 13/25
2022/0121884 A1 * 4/2022 Zadeh .................... G06N 3/006
2023/0042051 A1 * 2/2023 Clement ................ G06N 3/091
2023/0191608 A1 * 6/2023 Horowitz ................. B25J 9/163 700/245
2024/0135636 A1 * 4/2024 Ono ....................... G06V 10/56
2024/0149881 A1 * 5/2024 Villegas ............. B60W 60/001
2024/0161403 A1 * 5/2024 Lin .......................... G06T 3/40
2024/0273806 A1 * 8/2024 Chang ..................... G06T 15/04
(Continued)

FOREIGN PATENT DOCUMENTS

CN 115455162 A * 12/2022 ............. G06N 3/084

OTHER PUBLICATIONS

Alexander, Kirillov, et al., "Segment Anything", arXiv:2304.02643v1, (Apr. 5, 2023), 30 pgs.
(Continued)

*Primary Examiner* — Abderrahim Merouan
(74) *Attorney, Agent, or Firm* — Schwegman Lundberg & Woessner, P.A.

(57) ABSTRACT

A method of generating physically-based rendering (PBR) textures is disclosed. A 3D mesh input is received. One or more text prompts associated with the 3D mesh input are received. The 3D mesh input and the one or more text prompts are in put into a trained machine-learning model. Output data is received from the trained machine-learning model. The output data comprises material and texture information. The material and texture information enables rendered views of the 3D mesh with the output data to respond to changes in lighting in a real-time 3D rendering environment.

17 Claims, 9 Drawing Sheets
(6 of 9 Drawing Sheet(s) Filed in Color)

(56) References Cited

U.S. PATENT DOCUMENTS

| | | | | |
|---|---|---|---|---|
| 2025/0045980 | A1* | 2/2025 | Cao | G06N 3/045 |
| 2025/0111628 | A1* | 4/2025 | Han | G06T 7/90 |
| 2025/0191298 | A1* | 6/2025 | Mercier | G06T 17/00 |
| 2025/0218103 | A1* | 7/2025 | Vainer | G06T 15/04 |

OTHER PUBLICATIONS

Amit, Raj, et al., "DreamBooth3D: Subject-Driven Text-to-3D Generation", arXiv:2303.13508v2, (Mar. 27, 2023), 13 pgs.
Bar-Tal, Omar, et al., "MultiDiffusion: Fusing Diffusion Paths for Controlled Image Generation", arXiv:2302.08113v1, (Feb. 16, 2023), 16 pgs.
Burley, Brent, et al., "Physically Based Shading at Disney", ACM Transactions on Graphics (SIGGRAPH), (2012), 1-27.
Chen, Dave, et al., "Text2Tex Text-driven Texture Synthesis via Diffusion Models", arXiv:2303.11396v1, (Mar. 20, 2023), 1-15.
Chen, Rui, et al., "Fantasia3D Disentangling Geometry and Appearance for High-quality Text-to-3D Content Creation", arXiv:2303.13873v3, (Sep. 27, 2023), 1-11.
Cook, Robert, et al., "A Reflectance Model for Computer Graphics", ACM Transactions on Graphics (ToG), vol. 1, No. 1, (1982), 7-24.
Deitke, Matt, et al., "Objaverse: A Universe of Annotated 3D Objects", arXiv:2212.08051v1, (Dec. 15, 2022), 1-15.
Goodfellow, Ian J., et al., "Generative Adversarial Nets", Advances in Neural Information Processing Systems 27 (NIPS 2014), (Jun. 10, 2014), 9 pgs.
Ho, Jonathan, et al., "Denoising Diffusion Probabilistic Models", Advances in neural information processing systems, 33, (2020), 12 pgs.
Jaeyoung, Chung, et al., "LucidDreamer: Domain-free Generation of 3D Gaussian Splatting Scenes", arXiv:2311.13384v2, (Nov. 23, 2023), 1-11.
Karras, Tero, et al., "A Style-Based Generator Architecture for Generative Adversarial Networks", arXiv:1812.04948v3, (Mar. 29, 2019), 12 pgs.
Karras, Tero, et al., "Analyzing and Improving the Image Quality of StyleGAN", arXiv:1912.04958v2, [Online]. Retrieved from the Internet: <URL: https://arxiv.org/abs/1912.04958.pdf>, (Mar. 23, 2020), 21 pgs.
Karras, Tero, et al., "Progressive Growing of GANs for Improved Quality, Stability, and Variation", arXiv:1710.10196v3 [cs.NE], (Feb. 26, 2018), 26 pgs.
Ke, Bingxin, et al., "Repurposing Diffusion-Based Image Generators for Monocular Depth Estimation", arXiv:2312.02145v1, (Dec. 4, 2023), 33 pgs.
Kingma, Diederik P, et al., "Auto-Encoding Variational Bayes", arXiv:1312.6114v10, (2014), 14 pgs.
Knodt, Julian, et al., "Consistent Latent Diffusion for Mesh Texturing", arXiv:2312.00971v1, (Dec. 1, 2023), 17 pgs.
Le, Cindy, et al., "EucliDreamer Fast and High-Quality Texturing for 3D Models with Stable Diffusion Depth", arXiv:2311.15573v1, (Nov. 27, 2023), 13 pgs.
Liu, Fangfu, et al., "Sherpa3D: Boosting High-Fidelity Text-to-3D Generation via Coarse 3D Prior", arXiv:2312.06655v1, (Dec. 11, 2023), 19 pgs.
Liu, Ruoshi, et al., "Zero-1-to-3: Zero-shot One Image to 3D Object", arXiv:2303.11328v1, (Mar. 20, 2023), 13 pgs.
Liu, Zexiang, et al., "UniDream: Unifying Diffusion Priors for Relightable Text-to-3D Generation", arXiv:2312.08754v1, (Dec. 14, 2023), 11 pgs.
Long, Xiaoxiao, et al., "Wonder3D: Single Image to 3D using Cross-Domain Diffusion", arXiv:2310.15008v3, (Nov. 8, 2023), 13 pgs.
Luo, Weijian, et al., "Diff-Instruct: A Universal Approach for Transferring Knowledge From Pre-trained Diffusion Models", arXiv:2305.18455v2, (Jan. 15, 2024), 22 pgs.
Ma, Baorui, et al., "GeoDream: Disentangling 2D and Geometric Priors for High-Fidelity and Consistent 3D Generation", arXiv:2311.17971v2, (2023), 20 pgs.
Ma, Yiwei, et al., "X-Dreamer: Creating High-quality 3D Content by Bridging the Domain Gap Between Text-to-2D and Text-to-3D Generation", arXiv:2312.00085v2, (Dec. 25, 2023), 25 pgs.
Martin, Heusel, et al., "GANs Trained by a Two Time-Scale Update Rule Converge to a Local Nash Equilibrium", arXiv:1706.08500v6, (Jan. 12, 2018), 1-38.
Mildenhall, Ben, et al., "NeRF: Representing Scenes as Neural Radiance Fields for View Synthesis", arXiv:2006.10739, (2020), 25 pgs.
Pengsheng, Guo, et al., "StableDreamer Taming Noisy Score Distillation Sampling for Text-to-3D", arXiv:2312.02189v1, (Dec. 2, 2023), 1-14.
Philipp, Henzler, et al., "Generative Modelling of BRDF Textures from Flash Images", arXiv:2102.11861v2, (Sep. 10, 2021), 1-13.
Poole, Ben, et al., "Dreamfusion: TEXT-TO-3D Using 2D Diffusion", arXiv:2209.14988v1, (Sep. 29, 2022), 18 pgs.
Rombach, Robin, et al., "High-Resolution Image Synthesis with Latent Diffusion Models", arXiv:2112.10752v2 [cs.CV], (Apr. 13, 2022), 45 pgs.
Salimans, Tim, et al., "Improved Techniques for Training GANs", 30th Conference on Neural Information Processing Systems, Barcelona, Spain, (2016), 9 pgs.
Sarkar, Ayush, et al., "Shadows Don't Lie and Lines Can't Bend! Generative Models don't know Projective Geometry . . . for now", arXiv:2311.17138v1, (Nov. 28, 2023), 21 pgs.
Sauer, Axel, et al., "Adversarial Diffusion Distillation", arXiv:2311.17042v1, (Nov. 28, 2023), 16 pgs.
Schuhmann, Christoph, et al., "Laion-5b: An open large-scale dataset for training next generation image-text models", Advances in Neural Information Processing Systems, 35, (2022), 1-50.
Sharma, Prafull, et al., "Alchemist: Parametric Control of Material Properties with Diffusion Models", arXiv:2312.02970v1, (Dec. 5, 2023), 12 pgs.
Shi, Ruoxi, "Zero123++: a Single Image to Consistent Multi-view Diffusion Base Model", arXiv:2310.15110v1, (2023), 9 pgs.
Sohl-Dickstein, Jascha, et al., "Deep unsupervised learning using nonequilibrium thermodynamics", In Francis Bach and David Blei (eds.), Proceedings of the 32nd International Conference on Machine Learning, vol. 37 of Proceedings of Machine Learning Research Lille, France, [Online] Retrieved from the internet: <https://proceedings.mlr.press/v37/sohl-dickstein15.html>, (Jul. 7-9, 2015), 18 pgs.
Song, Jiaming, et al., "Denoising diffusion implicit models", arXivpreprint arXiv:2010.02502, (2020), 22 pgs.
Stan, Gabriela Ben Melech, et al., "LDM3D: Latent Diffusion Model for 3D", arXiv:2305.10853v2, (May 21, 2023), 10 pgs.
Subias, J. Daniel, et al., "In-the-wild Material Appearance Editing using Perceptual Attributes", Eurographics. arXiv:2302.03619v2, (2023), 13 pgs.
Tang, Boshi, et al., "Stable Score Distillation for High-Quality 3D Generation", arXiv:2312.09305v1, (2023), 21 pgs.
Tang, Jiaxiang, et al., "Dreamgaussian: Generative Gaussian Splatting for Efficient 3D Content Creation", arXiv:2309.16653v1, (Sep. 28, 2023), 17 pgs.
Tero, Karras, et al., "Alias-Free Generative Adversarial Networks", arXiv:2106.12423v4, (Oct. 18, 2021), 31 pgs.
Tham, Yik Foong, et al., "The Challenges of Image Generation Models in Generating Multi-Component Images", arXiv:2311.13620v1, (Nov. 22, 2023), 1-10.
Tianshi, Cao, et al., "TexFusion: Synthesizing 3D Textures with Text-Guided Image Diffusion Models", arXiv:2310.13772v1, (Oct. 20, 2023), 1-20.
Tianyu, Huang, "DreamControl Control-Based Text-to-3D Generation with 3D Self-Prior", arXiv:2312.06439v1, (Dec. 11, 2023), 10 pgs.
Van Den Oord, Aaron, et al., "Pixel Recurrent Neural Networks", arXiv:1601.06759v3, (Aug. 19, 2016), 11 pgs.
Van Den Oord, Aäron, et al., "Conditional Image Generation with PixelCNN Decoders", arXiv:1606.05328v2, (Jun. 18, 2016), 13 pgs.

(56) References Cited

OTHER PUBLICATIONS

Vecchio, Guiseppe, et al., "ControlMat: A Controlled Generative Approach to Material Capture", arXiv:2309.01700v2, (Sep. 25, 2023), 16 pgs.
Wan, Ziyu, et al., "CAD: Photorealistic 3D Generation via Adversarial Distillation", arXiv:2312.06663v1, (Dec. 11, 2023), 16 pgs.
Wang, Peihao, et al., "SteinDreamer: Variance Reduction for Text-To-3D Score Distillation via Stein Identity", arXiv:2401.00604v1, (Dec. 31, 2023), 17 pgs.
Wang, Xiaojuan, et al., "Generative Powers of Ten", arXiv:2312.02149v1, [Online]. Retrieved from the Internet: < URL: https://arxiv.org/abs/2312.02149>, (Dec. 4, 23), 1-13.
Wang, Zhaoning, et al., "LucidDreaming: Controllable Object-Centric 3D Generation", arXiv:2312.00588v1, (Nov. 30, 2023), 22 pgs.
Wang, Zhengyi, et al., "ProlificDreamer: High-Fidelity and Diverse Text-to-3D Generation with Variational Score Distillation", arXiv:2305.16213v2, (Nov. 22, 2023), 36 pgs.
Wu, Tong, et al., "HyperDreamer: Hyper-Realistic 3D Content Generation and Editing from a Single Image", arXiv:2312.04543v1, (2023), 9 pgs.
Xu, Xudong, et al., "MATLABER: Material-Aware Text-to-3D via LAtent BRDF auto-EncodeR", arXiv:2308.09278v1, (2023), 12 pgs.
Ye, Hu, et al., "IP-Adapter: Text Compatible Image Prompt Adapter for Text-to-Image Diffusion Models", arXiv:2308.06721v1, (2023), 16 pgs.
Yichun, Shi, et al., "Mvdream: Multi-view diffusion for 3d generation", arXiv:2308.16512v2, (Oct. 2, 2023), 21 pgs.
Ying-Tian, Liu, et al., "PI3D: Efficient Text-to-3D Generation with Pseudo-Image Diffusion", arXiv:2312.09069v1, (2023), 12 pgs.
Yiqun, Duan, et al., "DiffusionDepth: Diffusion Denoising Approach for Monocular Depth Estimation", arXiv:2303.05021v4, (Aug. 29, 2023), 1-16.
Youwang, Kim, et al., "Paint-it: Text-to-Texture Synthesis via Deep Convolutional Texture Map Optimization and Physically-Based Rendering", arXiv:2312.11360v1, (2023), 19 pgs.
Yu, Kai, et al., "Boosting3D: High-Fidelity Image-to-3D by Boosting 2D Diffusion Prior to 3D Prior with Progressive Learning", arXiv:2311.13617v1, (2023), 10 pgs.
Yukun, Huang, et al., "DreamTime an Improved Optimization Strategy for Text-to-3D Content Creation", arXiv:2306.12422v1, (Jun. 21, 2023), 13 pgs.
Zavadski, Denis, et al., "ControlNet-XS: Designing an Efficient and Effective Architecture for Controlling Text-to-Image Diffusion Models", arXiv:2312.06573v1, (2023), 20 pgs.
Zeng, Xianfang, et al., "Paint3D: Paint Anything 3D with Lighting-Less Texture Diffusion Models", arXiv:2312.13913v2, (2023), 15 pgs.
Zhang, Junwu, et al., "Repaint123: Fast and High-quality One Image to 3D Generation with Progressive Controllable 2D Repainting", rXiv:2312.13271v3, (2023), 1-13.
Zhang, Lvmin, et al., "Adding conditional control to text-to-image diffusion models", arXiv preprint arXiv:2302.05543, (2023), 12 pgs.
Zhang, Xinyang, et al., "Text2Layer: Layered Image Generation using Latent Diffusion Model", arXiv:2307.09781v1, (2023), 16 pgs.
Zhao, Wenliang, et al., "Unleashing Text-to-Image Diffusion Models for Visual Perception", arXiv:2303.02153v1, (2023), 10 pgs.
Zhou, Linqi, et al., "DreamPropeller: Supercharge Text-to-3D Generation with Parallel Sampling", arXiv:2311.17082v2, (2023), 13 pgs.
Zhuang, Jingyu, et al., "DreamEditor: Text-Driven 3D Scene Editing with Neural Fields", arXiv:2306.13455v3, (2023), 10 pgs.

* cited by examiner

GENERATING PHYSICALLY-BASED RENDERING (PBR) TEXTURES USING IMAGE-BASED DIFFUSION

TECHNICAL FIELD

The subject matter disclosed herein generally relates to the technical field of computer graphics, and in one specific example, to computer systems and methods for generating physically-based rendering (PBR) textures using image-based diffusion.

BACKGROUND

The field of computer graphics encompasses a variety of techniques and systems for creating visual content, particularly for rendering images that simulate the physical properties of objects. In the realm of three-dimensional (3D) graphics, textures play a crucial role in adding realism to digital models. Textures are applied to the surface of 3D models to give them a detailed appearance, which can include color variations, patterns, and other visual features that mimic real-world materials.

Traditionally, 3D content generation has relied on interpreting two-dimensional (2D) images as rendered observations of 3D objects. This process often involves the use of red, green, blue (RGB) images to provide the visual details for the textures. However, this approach has limitations in terms of photometric accuracy, as the RGB images do not always accurately represent the way light interacts with the surfaces of objects in a 3D space.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of example embodiments of the present disclosure will become apparent from the following detailed description, taken in combination with the appended drawings, in which.

DETAILED DESCRIPTION

Figure 1:
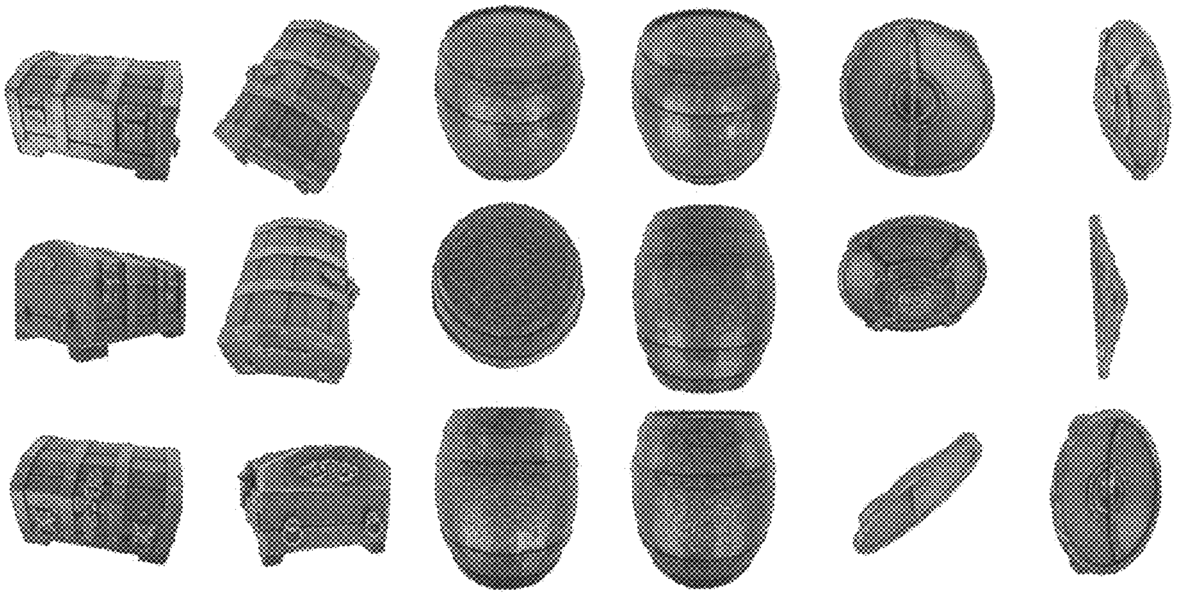
FIG. 1 is a set of images of example results of one or more applications of one or more techniques described herein for consistent material authoring for objects having varying base geometries, in accordance with one or more example embodiments.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the disclosed subject matter. It will be evident, however, to those skilled in the art, that various embodiments of the disclosed subject matter may be practiced without these specific details.

Current 3D content generation based on RGB images interprets the images as rendered observations of 3D objects. However, existing RGB image generators do not offer a true rendering function of 3D space as they are not photometrically accurate.

In contrast, the disclosed techniques, embodied as one or more methods, systems, or computer-readable media, instead directly models the underlying physically-based rendering (PBR) material properties (e.g., delegating shading to one or more algorithms) to sidestep both photometric inconsistencies in the generation and an inherent ambiguity in inverting shading.

The disclosed techniques overcome the data scarcity problem by tightly linking our PBR model to a pre-trained red, green, blue (RGB) model with a novel cross-domain attention module. In example embodiments, the disclosed techniques include training an artificial intelligence (AI) model (e.g., using a massive dataset of annotated 3D object, such as Objaverse) and generating qualitative, diverse, and out-of-distribution samples thanks to the rich internal state of a pretrained model.

The disclosed system can serve as a drop-in in a variety of 3D-content generation paradigms, where view-independent material properties generated by the system are suited for multi-view fusion and can be directly consumed in 3D software. In example embodiments, existing shapes may be textured either with score-based iterative optimization or by fusing multiple generated viewpoint samples.

With the recent rise of diffusion models, automated at-scale content generation of quality images is more accessible than ever. Building on this, several techniques and paradigms have been successful at lifting the generated images to 3D. But to maximize the usefulness of generated objects in various 3D content creation tasks, they must be compatible with established PBR pipelines for proper shading and relighting. As the diffusion models underlying recent 3D generative approaches generate RGB images, PBR knowledge needs to be extracted a posteriori.

State-of-the-art RGB diffusion models are, at best, an approximation of a proper rendering engine. For example, generated images often have inconsistent lighting and large-scale geometry. This is in addition to the significant challenge posed that inversion of the shading function (e.g., the transition from material properties and lighting to observed color), allows for significant ambiguities between the various PBR channels and the environment lighting (often visible as “baking in” illumination into the PBR maps or mutual detail bleeding between the PBR maps).

In example embodiments, and in contrast to existing techniques, the disclosed techniques include training an image-space PBR diffusion model to jointly predict a set of material parameters (e.g., such as all of the material parameters used by a 3D rendering application), avoiding the issues around the photometric consistency and ambiguities in inverse rendering. A proper choice of parametrization is paramount to the output quality. The disclosed techniques include steps for how to practically parametrize normal bump maps in a particular setting.

In example embodiments, unlike state-of-the-art RGB diffusion models, which are trained on internet-scale datasets of images, the disclosed techniques include steps to train on a more restrictive dataset, such as the Ojaverse dataset, with associated PBR materials. To still leverage internet-scale data, the system may be configured to tightly link our model to an existing RGB-space model using a novel cross-domain or cross-network attention module. In example embodiments, one or more Latent Diffusion Models (LDMs) may offer a significant improvement in performance and run-time. The system therefore also trains a dedicated PBR-space variational autoencoder (VAE) to compress the material parameter maps into a lower-resolution latent space.

In example embodiments, the disclosed system jointly generates well-parametrized material properties directly, trains a VAE to provide a compact latent space for these PBR maps, and/or uses cross-network attention to tightly link the PBR and RGB domains.

As a result, the disclosed techniques are able to generate qualitative and diverse PBR content, often far out-of-distribution of the original dataset, and that is directly usable in a variety of 3D content workflows.

In example embodiments, the proposed model can serve as a drop-in in a variety of 3d content generation paradigms. For example, the system specifically demonstrates that when texturing of existing 3D models, the view-independent material properties are much better suited for multi-view fusion, both in score-based iterative optimization and when fusing multiple generated viewpoint samples a posteriori.

In example embodiments, PBR is used enhance the realism of 3D models by more accurately simulating the interaction of light with material properties. PBR involves the use of material parameters and lighting information to produce images that respond to changes in lighting conditions in a predictable and realistic manner. This technique may be particularly useful in applications where the visual fidelity and consistency of materials under various lighting scenarios are of paramount importance.

There are challenges in efficiently generating and applying PBR textures to 3D models. The process of creating PBR textures can be labor-intensive and requires a deep understanding of material properties and lighting models. Additionally, the integration of PBR textures into existing 3D content creation workflows can be complex, as it often necessitates the adaptation of the textures to work within established PBR pipelines.

The disclosed systems and methods for generating PBR textures has the potential to streamline the texturing workflow for 3D models, making it more accessible and efficient. It leverages advancements in machine learning and artificial intelligence to automate the generation of high-quality PBR textures that are compatible with a variety of 3D content creation tasks.

A method of generating physically-based rendering (PBR) textures is disclosed. A 3D mesh input is received. One or more text prompts associated with the 3D mesh input are received. The 3D mesh input and the one or more text prompts are in put into a trained machine-learning model. Output data is received from the trained machine-learning model. The output data comprises material and texture information. The material and texture information enables rendered views of the 3D mesh with the output data to respond to changes in lighting in a real-time 3D rendering environment.

FIG. 1 is a set of images of example results of one or more applications of one or more techniques described herein for consistent material authoring for objects having varying base geometries. As seen in the images, the shininess of the objects from the light reflecting off of them has a level of consistency that cannot be realized using techniques known in the art. FIG. 1 illustrates example results showcasing the application of the disclosed techniques on objects with varying base geometries, such as spherical, cubic, and irregular forms, demonstrating the consistent authoring of materials like metal, wood, and fabric textures.

Figure 2:
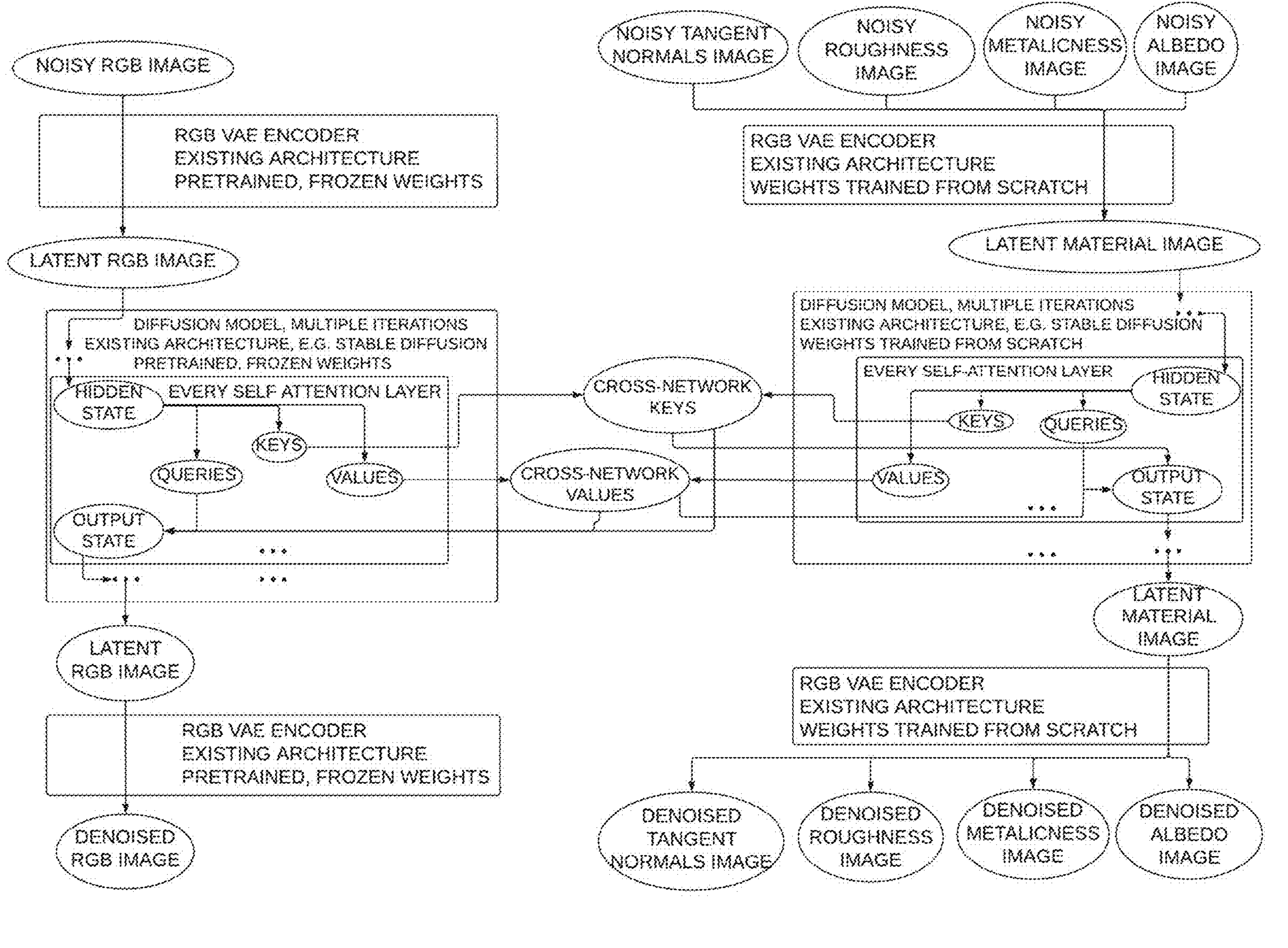
FIG. 2 is a diagram depicting an overview of use of techniques described herein in a texturing workflow for existing 3D models, in accordance with one or more example embodiments.

FIG. 2 illustrates a high-level overview of the architecture for a system designed to generate PBR textures using image-based diffusion techniques. The architecture is divided into two primary pathways: one for processing RGB images and another for generating PBR textures. Each pathway consists of an encoder, a diffusion model, and a decoder, which are interconnected by a cross-network attention mechanism. FIG. 2 outlines the texturing workflow process for existing 3D models, including the initial input of 3D geometry, application of the machine-learning model for texture generation, and the final rendering with PBR textures.

The RGB Image Processing Pathway is described below.

Noisy RGB Image Input. The pathway begins with a noisy RGB image, which serves as the starting point for the diffusion process.

RGB VAE Encoder. The noisy RGB image is then passed through an RGB Variational Autoencoder (VAE) Encoder. This encoder is based on an existing architecture with pretrained weights that are kept frozen during the process.

Latent RGB Image. The encoder transforms the noisy RGB image into a latent RGB image, which is a lower-dimensional representation of the original image in the latent space of the VAE.

Diffusion Model (RGB). The latent RGB image is fed into a diffusion model that performs multiple iterations to denoise the image. This model is based on an existing architecture, such as Stable Diffusion, with pretrained and frozen weights.

Hidden State Processing. During the diffusion process, the hidden state of the RGB image is processed through self-attention layers, which are part of the diffusion model.

Denoised RGB Image. The output from the diffusion model is a denoised RGB image, which is then passed through an RGB VAE Decoder to reconstruct the final clean RGB image.

The PBR Texture Generation Pathway is described below.

Noisy PBR Images Input. Simultaneously, the system receives noisy images for each PBR channel: e.g., tangent normals, roughness, metallicness, and albedo.

PBR VAE Encoder. These noisy images are processed by a PBR VAE Encoder, which is based on an existing architecture. Unlike the RGB encoder, the weights for the PBR encoder are trained from scratch to accommodate the specific characteristics of PBR textures.

Latent Material Image. The PBR encoder outputs a latent material image, which is a compressed representation of the PBR texture channels in the latent space.

Diffusion Model (PBR). The latent material image is then processed by a PBR diffusion model, which also performs multiple iterations to refine the PBR textures. This model's weights may be trained from scratch to generate high-quality PBR textures.

In example embodiments, the architecture includes a cross-network attention mechanism that connects the RGB and PBR diffusion models. This mechanism allows the PBR model to leverage the feature spaces of the pre-trained RGB model, enhancing the quality and consistency of the generated PBR textures.

In example embodiments, an output of the PBR diffusion model includes a set of denoised images for each PBR channel: e.g., tangent normals, roughness, metallicness, and albedo. These images are then reconstructed into high-quality PBR textures using the PBR VAE Decoder.

In example embodiments, a final output of the system is a set of high-fidelity PBR textures corresponding to the original noisy inputs, ready to be applied to 3D models for realistic rendering in various lighting conditions. The architecture depicted in FIG. 2 demonstrates a sophisticated approach to texture generation that combines the strengths of pre-trained RGB models with the precision of PBR-focused diffusion models, all orchestrated by a novel cross-network attention mechanism.

In example embodiments, the disclosed techniques include an application of PBR channels for avoiding an issue of entangling the object geometry and the generated tangent maps. In example embodiments, the disclosed techniques include training a VAE to compact PBR maps into a lower resolution latent space for more efficient training and inference. In example embodiments, the system links its novel PBR-generating diffusion model to an existing RGB model and provides an interpretation of the RGB model as a rendering approximation. In example embodiments, the disclosed techniques are implemented on specific architecture with regard to implementation of conditioning and training for specific use-cases.

PBR Material Properties

Figure 3A:
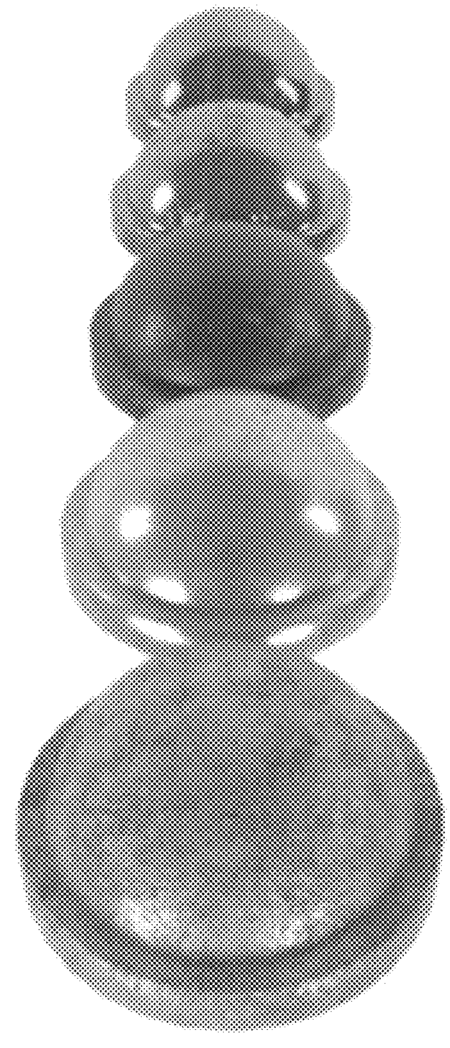
FIG. 3A is an example first image of a set of objects using dataset generation with camera co-located environment illumination, in accordance with one or more example embodiments.
Figure 3B:
FIG. 3B is an example second image of the set of objects of FIG. 3A, in accordance with one or more example embodiments.

FIG. 3A and FIG. 3B display a series of objects rendered under camera co-located environment illumination, with FIG. 3A showing the initial dataset generation and FIG. 3B demonstrating the variance in illumination across the same set of objects.

In example embodiments, the system generation predicts the view and illumination independent bidirectional reflectance distribution function (BRDF) parameters $b \in R^5$. In example embodiments, an analytical model, such as the Cook-Torrance analytical BRDF model, may be used for rendering. In example embodiments, the system may be configured to choose the Disney BRDF Basecolor-Metallic parametrization instead of independently predicting the diffuse and specular color, as it enforces physical correctness. The BRDF may then be composed of the Basecolor $b_a \in R^3$, the Metallic $b_m \in R$, and the Roughness $b_r \in R$.

To increase realism during rendering, small geometric details like wood grain or joints from tiles may be encoded in a tangent-space normal map $n_t$. These normal maps are then applied to an object based on its UV unwrapping, and tangent-space, which is a coordinate frame definition. The system may then modify the underlying geometry surface normals n to form the perturbed object-space normal $\hat{n}_{os}$. The geometry coordinate frame consists of the geometry normal n, the tangent t and the bitangent b. The tangent-space normals may be transformed to object-space using:

$$v(\tilde{v}) = t\tilde{v}_x + b\tilde{v}_y + n\tilde{v}_z \tag{1}$$

where v~ is the tangent-space normal $n_t$ and the function v produces the object-space normal $\hat{n}_{os}$.

However, object space normals $\hat{n}_{os}$ may be problematic to predict directly, as they entangle the underlying geometry's normals with the material properties. This can be seen in FIG. 4A. The tangent-space normal maps may also be defined in a texture atlas. If we interpret them directly as color, the directions are inconsistent as shown in FIG. 4B. For example, this can appear when the texture islands are rotated. Instead, the system may predict a normal map defined in the local geometry's surface tangent space. For example, the system may reverse the mapping of Eq. 1 with:

$$\tilde{v}(v) = t \cdot v,\ b \cdot v,\ n \cdot v^T \tag{2}$$

with defining the dot product. This transformation factors out the effects of UV unwrapping, and creates a consistent geometry tangent space $n_{gt}$. The resulting vector is thus globally consistent, as illustrated in last image of FIG. 4C. This means that, if the system predicts no additional perturbations as part of the material, the output prediction is a unit vector perfectly pointing in the direction of z-axis.

Figure 4A:
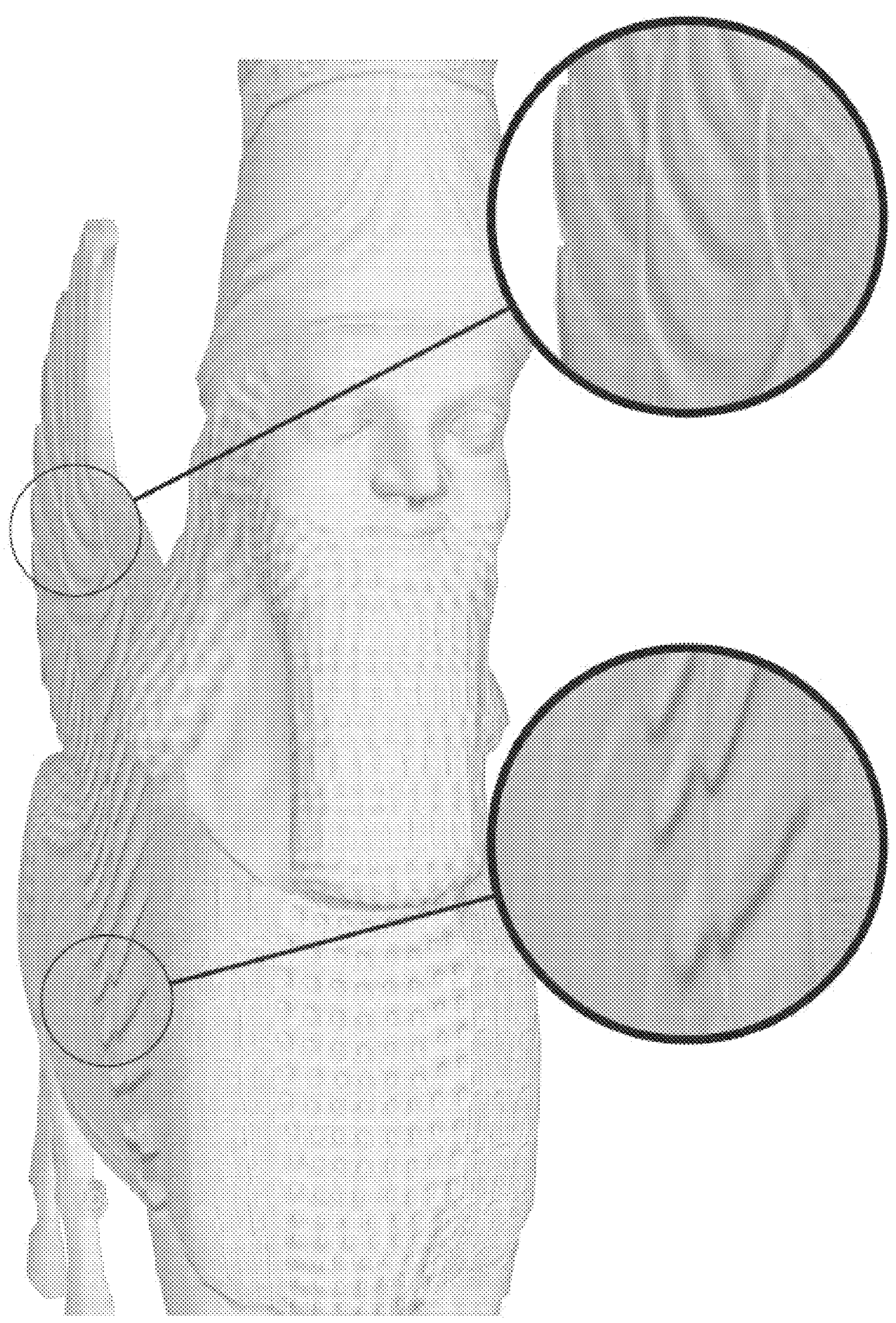
FIG. 4A is an image rendered in an object space normal map, in accordance with one or more example embodiments.
Figure 4B:
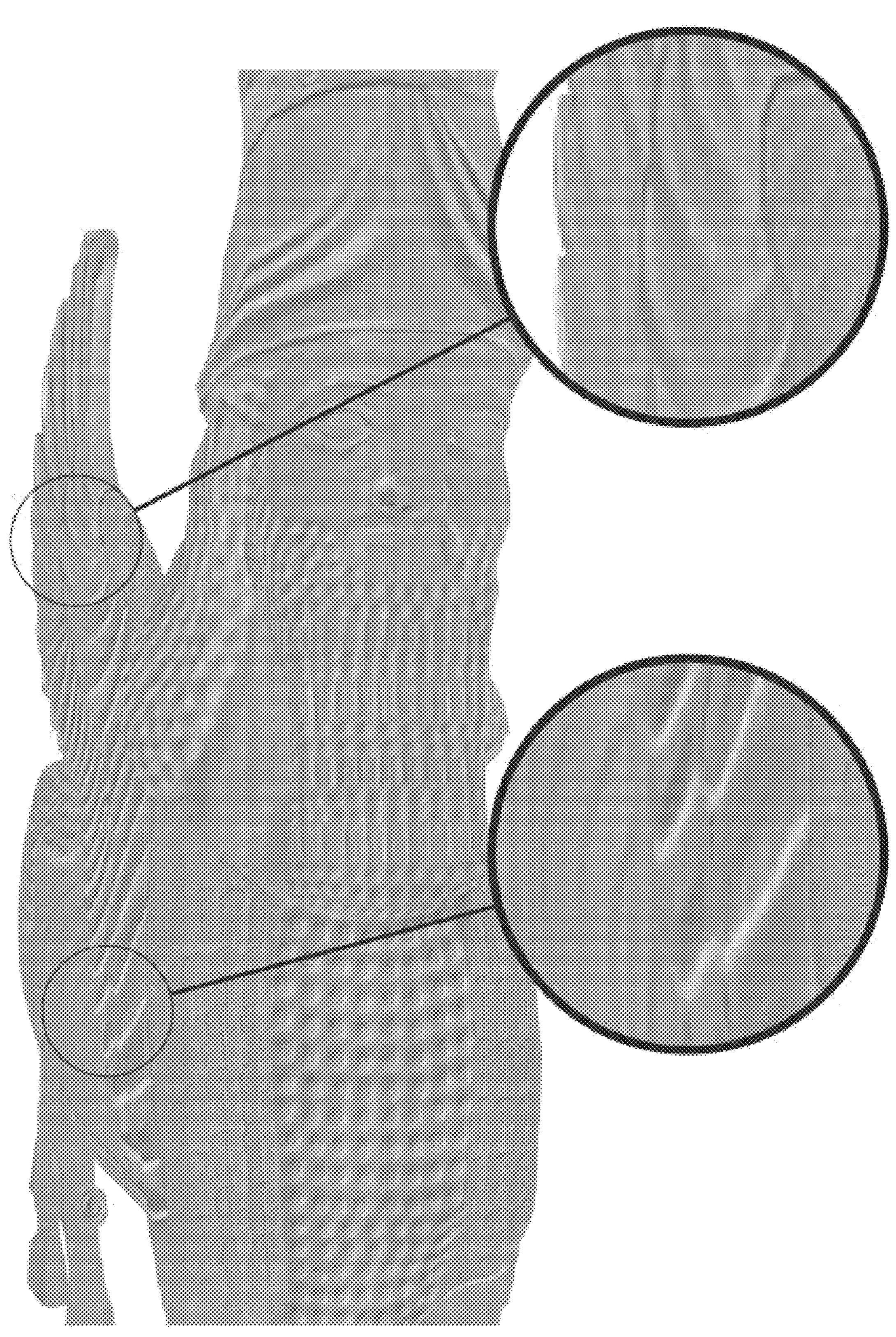
FIG. 4B is an image of the object of FIG. 4A rendered in a tangent space normal map, in accordance with one or more example embodiments.
Figure 4C:
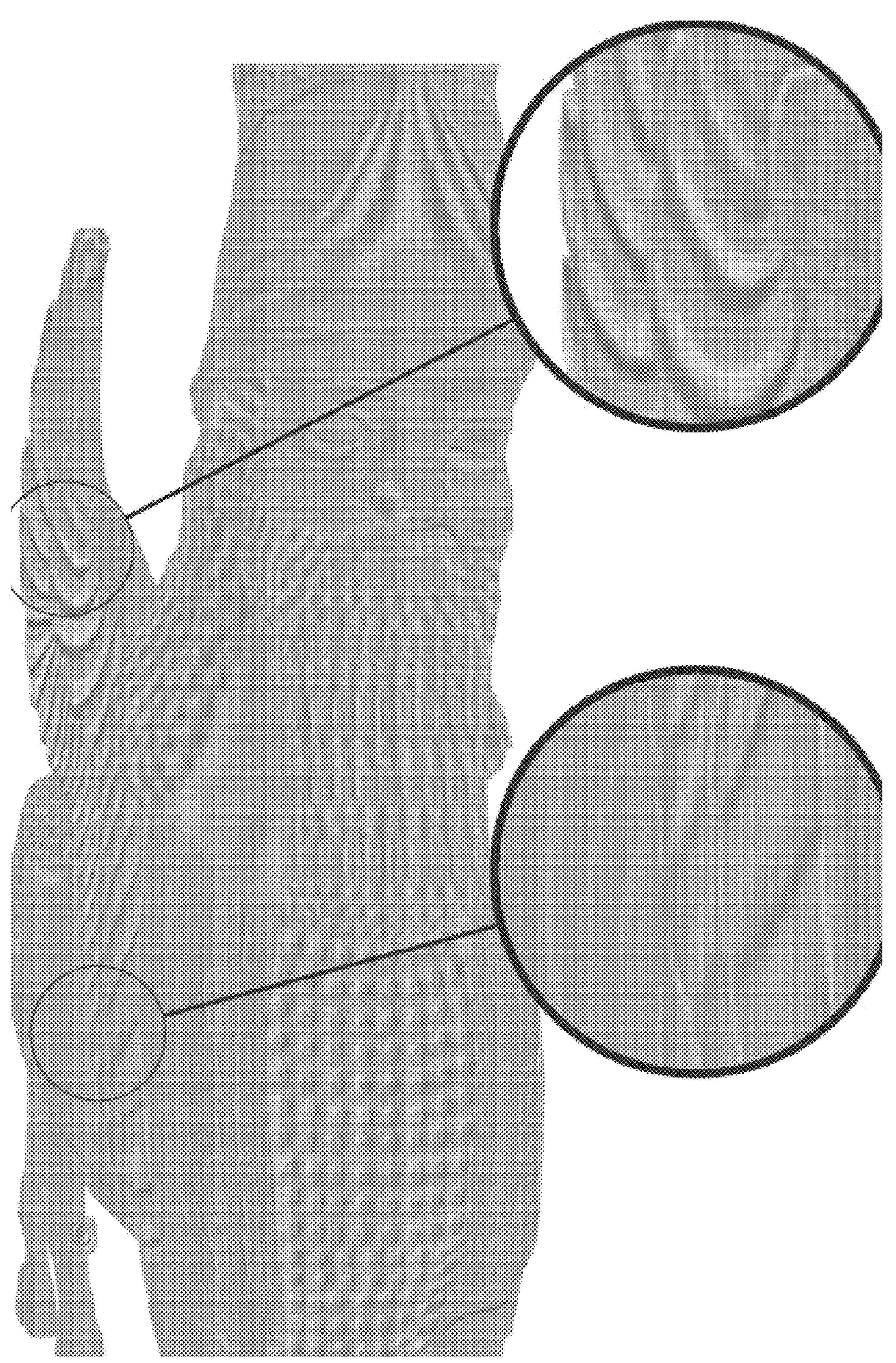
FIG. 4C is an image of the object of FIG. 4A and FIG. 4B converted to a geometry tangent space normal map, in accordance with one or more example embodiments.

FIG. 4A depicts an object rendered with an object space normal map, highlighting the surface normals in relation to the object's geometry. FIG. 4B shows the same object with a tangent space normal map, emphasizing the texture details. FIG. 4C illustrates the conversion process to a geometry tangent space normal map, ensuring consistency and compatibility with various rendering systems.

Jointly generating material properties with LDMs. Existing methods either model each of the multi-modals independently but conditionally on the conditioning image, or model each of the multi-modals sequentially on one-another.

By instead modeling the entire set of PBR textures as a single, joint, distribution with a single diffusion model, the disclosed system enables more flexible sampling and conditioning. However, RGB-based models may benefit from an auto-encoder (AE), which embeds high-resolution RGB images into a lower-dimensional latent space for more efficient processing. By modeling conditional distributions, the system may be configured to re-use the latent spaces of pre-trained VAEs and simply split the PBR stack into channel triplets, training fine-tuned diffusion models to represent a variety of conditional distributions. In example embodiments, the system may be configured to use this technique to create conditional-distribution baselines. In example embodiments, by training a new encoder-decoder pair, embedding the full PBR stack into a single latent space, the system can be configured to train a single diffusion model to model the fully joint distribution. In example embodiments, this leads to more diversity and quality, as the system is no longer restricted to modeling marginal conditional distributions.

Cross-network attention for leveraging the RGB-pre-trained feature spaces. In order to better leverage the knowledge of strong pre-trained models, the system may be configured to use a novel cross-attention paradigm. Assuming two parallel networks of identical architecture, the system may be configured to replace a self-attention layer with a cross-network attention (CNA) layer. This CNA layer may take the feature maps of both networks as input, and may output identical features to both networks, who continue inference as usual. In example embodiments, the system may be configured to train the CNA layer from scratch, without significantly impacting the quality or diversity of the frozen RGB model. This effectively forces the newly trained PBR diffusion model to align to the internal feature spaces of the pre-trained network (which, in example embodiments, may be a strong anchor during training) as well as leveraging the rich internal representation for the RGB network.

Training details, model input/output, data generation. In example embodiments, the system's diffusion model is conditioned on the existing model geometry. In example embodiments, there may be various options of rasterized features, such as object-space coordinates of the geometry, camera-space normals of the geometry, and/or camera-space depth of the geometry.

In example embodiments, the system may determine that camera-space normals yield the best results. For example, camera-space normals may provide a pose- and world-invariant feature cue (much more so than object-space coordinates), while also providing a more rich representation than simple camera-space depth. In example embodiments, this may not be a huge issue for multi-view fusion; e.g., normals+object coordinates might help a lot for multi-view consistency. In example embodiments, the joint conditioning on normals and depth yields no significant improvements over normals alone, so the system may be configured to select the simpler option.

Experiments

The techniques used by the system and its configuration can be tested individual (e.g., through a slew of ablation studies) to demonstrate the advantage of generation in the PBR domain over post-hoc methods, such as those used by Fantasia3D, which generate in the RGB domain and then solve an inverse rendering problem to return to the PBR space.

In example embodiments, specific datasets are used for training and evaluation, as well as the training details for the PBR cross-modality VAE and the PBR image diffusion model. The system may be configured based on particular metrics used for the evaluations. For example, the system's results may be evaluated on one or more of (1) quality and/or diversity of the generated PBR stacks and (2) out-of-distribution generation by leveraging the expressivity of the base RGB SD model.

Preliminaries Training Dataset

A dataset for training both the VAE and the LDM may be based on a particular dataset, such as on an Objaverse data set containing 500'000+ 3D models associated PBR stack as we consume it, as well as annotations for what the models represent (both in terms of shape and in terms of texture). In example embodiments, each of the objects may be rendered with a tool (e.g., Blender 2.35) from a configurable number of (e.g., 12) viewpoints (e.g., using a fixed pinhole camera model and a fixed camera co-located environment map). In example embodiments, the system may store one or more of camera parameters; geometry depth, geometry normals, and a default radial geometry tangent (e.g., as used by the rendering tool); the PBR material stack: base color, metallicness, roughness; the final screen-space normals after applying the texture bump map; and/or the final rendered color.

In example embodiments, varying the camera model may not result in a meaningful difference in the trained network or its ability to generalize, so the system may be configured to simplify the data generation by keeping it fixed. In example embodiments, the environment may be configured to be (1) uniform across the dataset and/or (2) co-located with the camera. In example embodiments, the rendered color may only be used by the system to supervise the RGB diffusion model's output to make sure that the attention maps injected by the system's novel cross-network attention module are consistent with the hidden space of the RGB diffusion model. As the weights of the RGB SD model are kept fixed, there is (1) no risk of over-fitting on our dataset and (2) no reason to make the dataset more complicated than it needs to be; again, therefore, the system may be configured to keep the data generation as simple as possible.

Evaluation Datasets

In addition to re-using the above training dataset in the evaluation to verify that the system's generator well represents that dataset's distribution, the system may also be configured to leverage a higher-quality dataset, such as a dataset gathered from Polyhaven. The higher-quality dataset may contain a smaller number of (e.g., only 300) models, but these are models may be of camera-ready quality, authored by professional artists. Again, the models come with a complete PBR stack texture, as well as accurate annotation as to their shape and style. The system may be configured to render the higher quality dataset in exactly the same way as the lower-quality (e.g., Objaverse) dataset.

In example embodiments, the system may be configured to require a set of out-of-distribution prompts for any given object (e.g., to verify that that the system is able to generate qualitative content that is out-of-distribution for the original dataset. In example embodiments, the system may be configured to pick a subset of objects from both data sets (e.g., from both Objaverse and Polyhaven), and ask a large language model (e.g., ChatGPT3.5), "What are 8 very unlikely appearances for <object>". This becomes the out-of-distribution prompt query dataset that system may use for evaluation out-of-distribution content accuracy.

Training the VAE

The system may be configured to train a VAE (e.g., with KL regularization) which downsamples a region (e.g., of 4×4 pixels) with a configurable number of (e.g., 8) channels (base color, metallicness, roughness, and/or bump map) into a single pixel with more (e.g., 14) channels. In example embodiments, the system may be configured to not use a quantized VAE (e.g., because of the high dimensionality absolute of the source space (e.g., 8 compared to existing QVAE solutions in the LDM space with, e.g., 3) as well as the strongly different characteristics of the PBR stack. For example, color, specular components, and/or bump maps may be, to a large extent, independent of each other, meaning that the practical dimensionality of the patch manifold rises even more than the (e.g., 3-to-8) ratio implies.

In example embodiments, only minor edits may be required to the VAE (e.g., for changing the input and output dimensionalities and modalities).

Training the PBR Image Diffusion Model

In example embodiments, the system may be configured to run two parallel models both for training and inference: (1) the PBR-space diffusion model and (2) the frozen SD RGB-space model. For the frozen model, the system may be configured to use the existing supervision losses in δv prediction mode to ensure that the cross-network attention module leaves the model output intact. For example, only the weights in the cross-network attention module may be trained. For the PBR-space model, the system may train the entire weight set from scratch using the same loss set on each of the PBR channels (e.g., albedo, metallicness, roughness, and/or perturbed normals) separately.

Metrics

The system may be configured to evaluate various aspects of its generative network, such as quality, diversity, and/or out-of-distribution accuracy.

In example embodiments, distribution match may be evaluated through a score, such as an inception score (IS) or Fréchet Inception Distance (FID), which may be considered a proxy to both quality and diversity. IS evaluates the classification score outputs of a pre-trained (e.g., Inceptionv3) network. The score is optimal when individual samples' classification score vectors have low entropy (e.g., Inceptionv3 would confidently predict a single class) and the per-sample winning class has high entropy over the entire dataset (e.g., the generator generates all classes). In theory, it is only directly relevant to generators over the training dataset of the (e.g., Inceptionv3) model, but in practice it may also be indicative for comparison between methods on other datasets. However, the FID, to a large extent, abstracts away the underlying dataset of the pretrained model. It compares the distributions of the last hidden state of the same (e.g., Inceptionv3) network on both generated images and a reference dataset. In example embodiments, FID may be found to much better align to perceptual quality. As the (e.g., Inceptionv3) network assumes RGB input, the system may split the PBR stack in parts, such as the following four parts: base color, metallicness and roughness (both individually as grayscale images), and the final perturbed normal maps.

Quality of the PBR maps may be more difficult to quantize without ground-truth corresponding PBR maps. Perceptually, many of existing techniques bake in illumination into the various channels, or leak details between the various channels.

Out-of-distribution accuracy indicates the level to which the system's generator can align to conditioning which it has never seen during training. In example embodiments, a score, such as CLIP alignment score, may be determined. The score may evaluate whether the text prompt's CLIP embedding is close to the generated image's CLIP embedding, (e.g., whether every aspect of the text prompt is actually present in the image without introducing frivolous unrequested content).

In example embodiments, user studies may be included as a piece of the system's evaluation, verifying that end-user artists agree with the indications provided by the above quantitative metrics. In example embodiments, the qualitative evaluation through FID and IS may not be very sensitive to low-level image details. In example embodiments, IS may even less so than FID, which are however important (perhaps even more so in PBR stacks than in RGB images). Therefore, based on a randomized blind selection query, the system may evaluate with a set of graphics artists which set of PBR maps they would prefer, and respectively which of them would require the least work to edit to their liking.

Ablation Studies

In example embodiments, the system may evaluate various design choices of its architecture. Assuming that the system builds up a model that predicts directly in the PBR space, the system determines how much do each of those choices contribute to the final performance of our model.

Joint VAE for the PBR Stack

In order to still leverage the LDM paradigm in PBR space, the system may be configured to encode the patches of the (e.g., 8) PBR channels into a single latent vector.

For example, the system may be configured to (1) train a new encoder/decoder for the same latent space as the existing VAE (practically, with minimal changes from the existing architecture), (2) split the (e.g., 8 channels into pair-wise three channels, such as base color, perturbed normals, and metallicness+roughness[+ambient occlusion=zeros]), including re-using the RGB VAE for each of the triplets, with no additional training, and re-training per-triplet VAEs from the initial checkpoint, (3) a quantized which the system retrains from scratch with a larger latent space dimensionality, and/or (4) a novel architecture which the system retrains from scratch with a larger latent space dimensionality.

In example embodiments, the system is configured to train (as relevant) each of these variants on the original (e.g., Objaverse) dataset. Quantitative and qualitative evaluations on both the lower-quality and higher-quality dataset may be analyzed. In example embodiments, the system may determine that training a larger VAE from scratch is the way to go, as it better captures both the individual channels' characteristics and the inter-dependency between the channels and/or it quantitatively and/or visually results in fewer artefacts when encoding-decoding sample patches from either dataset.

Joint Prediction of the PBR Stack

When it comes to predicting the various PBR channels (conditioned in whatever way) p(albedo, metallicness, roughness, normals|condition), the system may be configured to identify one or more options, such as one or more of the following options:

1. independent generation of each of the channels. p(albedo|condition), p(metallicness|condition), separately. This models the marginal conditional distributions and will not be able to model the interaction between the various channels that is contained in the full joint distribution, because only when all channels are independent does the relationship p(albedo|condition)p(metallicness|condition) . . . =p(albedo, metallicness, . . . |condition) hold.

2. conditional, sequential generation of the channels. E.g. p(albedo|condition), p(metallicness|sequentially. This follows from the recursive relationship p(albedo, metallicness, . . . |condition) p(albedo|condition)p(metallicness, . . . |albedo, condition). However, in practice this means that the system is configured to train and evaluate four individual networks (representing diffusion process) where the subsequent one can only start training and inferring when the preceding one has finished, which is an unpractically expensive workflow.

3. joint modeling of the direct p(albedo, metallicness, . . . |condition) as represented by the system's approach.

The system may be configured to evaluate the independent versus the joint modeling of the channels, which shows the type of performance loss when ignoring the channel interdependencies.

Cross-Modality/-Network Attention Module.

In example embodiments, the system may be configured to use one or more alternative approaches for cross-modal attention/guidance.

Such alternative approaches may include one or more of the following: (1) Similar to the VAE discussion in the previous section, creating finetuned versions of the RGB SD module to predict the channels in sets of three, using either a ControlNet or a LoRA; (2) Using minimal network intrusions to directly predict the full set of PBR channels, using either a ControlNet or a LoRA, and/or (3) a different cross-network attention paradigm.

In terms of predicting channel triplets independently (or conditioned on each other), modeling the distribution in such a way may be suboptimal, as described above. Here the discussion kind of implies that the system should try to use the conditional sequential generation of the channels using minimal intrusions on an existing pre-trained diffusion model in RGB space. For all the same reasons that we discuss in the VAE's architecture, jointly predicting the entire PBR stack using minimal intrusions on a pre-trained RGB-space diffusion model is unlikely to work well in most circumstances because the internals of the diffusion model are not able to correctly represent the higher-dimensional material property space in a disentangled way.

In example embodiments, the system may be configured to compare the full cross-network attention paradigm to one where the RGB SD model does not get new attention values injected. Here, there is only a one-way stream of attention from the RGB SD to the PBR SD. In example embodiments, the system may determine that there is a significant gain in the two-way cross-network attention paradigm. This may be attributed to forcing the PBR-based model to actively align to the RGB SD model's internal space, which is strongly structured and highly expressive—the system may be essentially forcing the PBR-based model to simultaneously leverage the RGB SD model as a rendering function proxy. This is in contrast to only pulling information directly from the RGB-space SD; a rich source of information, but it does not offer the two-fold near-differentiable-rendering-paradigm that our proposed paradigm brings.

Conditioning Cue

In example embodiments, the system may be configured to consider conditioning on either text prompts or object geometry. In example embodiments, the system may be configured explicitly to not consider conditioning on the final observations in RGB space (e.g., this would mean that our model is addressing the inverse rendering problem).

In example embodiments, the system's paradigm of cross-network attention may break down under certain circumstances. For example, the PBR-space diffusion model receives the target output of the RGBspace model as direct inputs, so it is easily able to leverage the cross-network attention to circumvent true prediction of the internal hidden space and as a result, fails to leverage the internal hidden state of the RGB network.

As far as conditioning on the geometry goes, the system may identify and perform one or more of the following options: (1) Conditioning on camera-space depth, (2) Conditioning on object-space coordinates, and/or (3) Conditioning on camera-space normals.

In example embodiments, depth and coordinates are not as rich of an input/conditioning as surface normals are.

Parametrization of the Material Properties

The system's PBR-space diffusion model may be configured to return one or more of base color, metallicness, roughness, and/or perturbed normals conditioned on object geometry. In practice, the first three can be considered "boring" channel outputs in that they are wellbehaved within a normal range, and not formulated in an "arbitrary" space. The perturbed normals, however, may be expressed in screen space, but also encode the object geometry. Instead, the system may be configured to predict a differential normal image (e.g., because the optimization problem of directly predicting screen-space perturbed normals may be a more difficult one, as well as that those features may be view-dependent so that the system cannot easily fuse them across different views in downstream applications). In example embodiments, the (e.g., Markspace) normals are (1) differential, in that they are formulated in terms of a geometry-normal-and-tangent dependent coordinate space and (2) view independent, so that they can be directly synchronized across all views in the joint latent representation. In example embodiments, they also do not depend on an arbitrary coordinate system choice stemming from the UV parametrization. The system may be configured to analyze, select, and/or use one or more of the following alternative parametrizations:

Screen-space perturbed normals;

World-space perturbed normals;

Screen-space direct-differential normals (e.g., screen-space perturbed normals;

screen-space geometry normals);

World-space direct-differential normals (e.g., world-space perturbed normals;

world-space geometry normals);

Global Markspace normals (e.g., the screen-space perturbed normals expressed in the local normal-tangent-bitangent coordinate system implied by the world up axis); and/or Screen Markspace normals (e.g., the screen-space perturbed normals expressed in the local normal-tangent-bitangent coordinate system implied by the camera X axis).

In example embodiments, Markspace normals may be the winners in terms of performance of the generative method. Screen-based Markspace normals may perform only marginally better, so that the system—in the interest of downstream applications—may decide on Global Markspace normals for its parametrization choice.

Existing techniques focus on directly predicting only RGB-based images of objects.

Some existing methods which lift 2D models to 3D generate PBR stacks for the generated images (e.g., Fantasia3D). However, they arrive at the generated PBR stacks through variants on inverse rendering. In contrast, the disclosed techniques qualitatively compare against the output of such methods in the system's application to shape texturing.

In terms of direct PBR generation/prediction, tools such as SurfaceNet or ControlMat may generate plausible PBR stacks for an RGB observation. In example embodiments, when there are no direct generative models to compare against, the quality of the system's created PBR stacks may be evaluated against the PBR stacks created by such tools.

For example, SurfaceNet may be run as a reconstructive technique on objects in Objaverse and Polyhaven (e.g., conditioned on an observation), and one sample of the system may be generated (e.g., conditioned only on the screen-space normals, without the text prompt). The system may then calculate the FID and IS of each of these sample sets against the ground truths in the respective datasets.

In terms of geometry-conditioned (or -unconditioned) generation of PBR stacks, there are no known tools that leverage VAEs or GANs.

In example embodiments, the system's image-based PBR-space diffusion model can serve as a drop-in base model (with minimal code changes) to a series of existing text-to-3D paradigms that distill from frozen 2D image-based models. For example, the system can be used in two significantly different pipelines, such as TexFusion and SDS.

The systems and methods disclosed herein introduce a transformative method for generating PBR textures, which is a significant departure from conventional techniques. The disclosed techniques include a unique integration of a cross-domain attention module within a machine-learning framework, which facilitates the translation of RGB image data into PBR textures. This cross-domain attention module is a novel construct that enables the machine-learning model to leverage the rich feature representations of pre-trained RGB models while generating PBR textures that are photometrically accurate and consistent across various lighting conditions. The non-obviousness of this approach is underscored by its ability to resolve the inherent limitations of RGB-based texture generation methods, which often fail to capture the complex interplay of light with material surfaces in a 3D space.

In an example embodiment, a machine-learning model is trained on a dataset comprising a wide array of annotated 3D objects. This dataset includes PBR textures representing diverse material types such as metals with varying degrees of oxidation, fabrics with different weaves and thread counts, and natural elements with unique surface irregularities. In example embodiments, the dataset is meticulously curated to encompass view-independent material properties, ensuring that the generated PBR textures are optimized for multi-view fusion and yield consistent rendering results under diverse lighting scenarios. As but one example, consider generation of PBR textures for a vintage brass telescope, where the model accurately predicts the patina and specular highlights that are characteristic of aged brass under moonlight, sunlight, and artificial indoor lighting.

In example embodiments, the machine-learning model is trained using a dataset augmented with synthetic lighting conditions, which are algorithmically generated to cover a comprehensive spectrum of environmental lighting scenarios. This augmentation enhances the model's robustness and its ability to generalize the generation of PBR textures, ensuring that the textures respond accurately to real-world lighting changes.

In example embodiments, generative adversarial networks (GANs) are utilized to synthesize a vast and varied dataset of 3D objects with corresponding PBR textures. In example embodiments, the training process is further augmented by a rigorous validation step, wherein the model's output is meticulously compared against a subset of the dataset not utilized during the training phase. This comparison helps to ensure the accuracy and reliability of the model's output, thereby enabling the practical application of the disclosed techniques.

In example embodiments, to generate a 3D object with PBR textures using the disclosed system for incorporation into a game engine or similar rendering tool, a user (via a user interface) or an external system (via an application programming interface) would engage in one or more of the following steps.

Step 1: Preparing the 3D Mesh. The user or external system begins by creating or selecting a 3D mesh that will serve as the base geometry for the object. This mesh should be properly UV unwrapped to allow for accurate texturing.

Step 2: Defining Material Properties. The user or external system defines the desired material properties for the object, such as base color, metallic, roughness, and any additional features like bump maps or specular highlights. These properties can be specified directly or through descriptive text prompts that convey the intended appearance.

Step 3: Inputting Data into the Machine-Learning Model. The 3D mesh and material property prompts are input into a trained machine-learning model. The model utilizes a novel cross-domain attention module that leverages pre-trained RGB models to predict PBR textures that are photometrically accurate.

Step 4: Machine-Learning Model Processing. The machine-learning model processes the input data, generating output data that includes the PBR textures. This process involves the model's internal algorithms, which have been trained on a comprehensive dataset of annotated 3D objects with associated PBR textures.

Step 5: Reviewing Generated Textures. Once the PBR textures are generated, the user or external system reviews them for quality and accuracy. Adjustments to the text prompts or input parameters can be made if the generated textures do not meet the desired specifications.

Step 6: Applying Textures to the 3D Mesh. The generated PBR textures are applied to the 3D mesh. The system ensures that the textures respond correctly to changes in lighting and environmental conditions, providing a realistic appearance in various rendering scenarios.

Step 7: Exporting the Textured 3D Object. The textured 3D object is exported from the system in a format compatible with the user's game engine or rendering tool. This may involve the use of specialized file formats, such as .OBJ, .FBX, or .GLTF, which include the mesh and associated PBR texture data.

Step 8: Importing into a Game Engine. The user or external system imports the textured 3D object into a chosen game engine or rendering tool. The object is then integrated into the game or scene, where it can be placed, transformed, and further manipulated as required.

Step 9: Final Rendering and Adjustments. Within the game engine, the user or external system performs a final rendering of the object. At this stage, additional adjustments can be made to the object's materials and textures to fine-tune its appearance under the specific lighting and environmental conditions of the game or scene.

Step 10: Iteration and Optimization. The user or external system iterates on the texturing process as necessary, optimizing the 3D object for performance and visual quality within the game engine. This may involve adjusting texture resolutions, LODs (levels of detail), or shader parameters to achieve the best balance between realism and performance.

In summary, users or external systems can leverage the disclosed system to generate high-quality PBR textures for 3D objects, enhancing the realism and visual fidelity of their digital content within game engines and rendering tools.

The system for generating 3D objects with PBR textures is architecturally designed to integrate seamlessly with modern game engines and rendering tools. In example embodiments, the architecture of the system comprises one or more components that work in concert to facilitate the generation, application, and/or export of PBR textures for use in various digital content creation environments.

Graphical User Interface (GUI). The system includes a GUI that allows users to, for example, input 3D meshes, define material properties through text prompts or graphical selectors, and review the generated PBR textures.

Machine-Learning Model. The system includes a trained machine-learning model equipped with a cross-domain attention module, as described herein. This model processes the input data and generates PBR textures based on the defined material properties and learned patterns from a comprehensive dataset.

Data Processing Unit. The system may include a dedicated processing unit that handles the computational tasks associated with the machine-learning model, including data ingestion, model inference, and/or texture synthesis.

Texture Application Module. The system may include a module responsible for applying the generated PBR textures to the input 3D mesh, ensuring that the textures align correctly with the UV mapping of the mesh.

Export Module. The system may include a module facilitates the export of the textured 3D object in various file formats compatible with different game engines and rendering tools.

Storage System. The system may include a storage solution for saving the input 3D meshes, generated PBR textures, and/or the final textured 3D objects. This storage system may include local storage, network-attached storage, or cloud-based storage services.

The system is designed to be communicatively coupled to one or more additional systems to enhance its functionality and interoperability.

For example, the system can be directly integrated with game engines (e.g., Unity) and rendering tools (e.g., Blender, Maya) through APIs or plugin frameworks. This allows for the seamless import and export of 3D objects and textures. For larger production environments, the system can be coupled with digital asset management systems to organize and track the various assets being created and used throughout the content creation process. The system can be configured to interface with collaboration platforms and version control systems (e.g., Perforce, Git) to enable multiple users to work on the same 3D objects and textures simultaneously, ensuring consistency and synchronization of assets. To leverage scalable computing resources, the system can be connected to cloud computing services (e.g., AWS, Azure) for processing-intensive tasks such as training the machine-learning model or generating textures for complex objects. The system architecture allows for the integration of data analytics and user feedback systems to monitor usage patterns, gather user feedback, and continuously improve the machine-learning model based on real-world data.

The system offers various configurable aspects to accommodate different user needs and integration requirements. Configuration can be performed through an administrative GUI or programmatically via an application programming interface (API).

The administrative GUI is designed for ease of use, allowing users to configure settings through a graphical interface. Users can log in to the administrative panel to access one or more configuration settings, examples of which are provided herein and may include one or more of the following.

Dataset Selection. Users can select and manage datasets used for training the machine-learning model. For example, a user might choose a dataset focused on automotive materials for generating textures specific to vehicle models.

Model Training Parameters. The GUI allows users to set parameters for training the machine-learning model, such as the number of training epochs, learning rate, and batch size. A user might increase the number of epochs for a more thorough training process.

Texture Resolution. Users can define the resolution for generated textures, adjusting for different levels of detail required by their project. For instance, a user might set a high resolution for close-up renders and a lower one for background objects.

Export Formats. The system supports various export formats, and users can select their preferred format (e.g., .OBJ, .FBX, .GLTF) based on the target game engine or rendering tool.

Rendering Settings. Users can configure rendering settings such as lighting models, shadow quality, and reflection intensity to preview how textures will appear in the final render.

For programmatic access and integration with external systems, the system provides an API that allows for automated configuration. The API can be used to set configurations (e.g., by sending HTTP requests with the desired parameters). Examples are described herein and may include one or more of the following.

Automated Dataset Management. An external system can use the API to upload new datasets or switch between existing ones by sending a request with the dataset identifier.

Dynamic Texture Resolution Adjustment. Depending on the computational resources available, an external system might dynamically adjust the texture resolution via the API to balance quality and performance.

Batch Processing Configuration. For bulk texture generation, the API can be used to configure batch processing settings, such as queue size and priority levels.

Integration with Asset Pipelines. The API can be used to integrate the system with existing asset pipelines, allowing for the automated application of textures to 3D models as they move through the production stages.

Custom Export Workflows. External systems can configure custom export workflows using the API, specifying file naming conventions, directory structures, and post-export actions such as triggering additional processing or notifications.

For example, in example embodiments, a game development studio might use the administrative GUI to configure the system for high-resolution texture generation, selecting a specific dataset that includes a variety of natural environment materials for their open-world game.

An animation studio could use the API to integrate the system into their rendering pipeline, setting the texture resolution and export formats to match their in-house tools and ensuring seamless asset transitions.

A mobile game developer might configure lower texture resolutions and simplified rendering settings via the UI to optimize for performance on mobile devices.

Both the administrative GUI and the API provide robust and flexible methods for configuring the system, ensuring that it can be tailored to meet the specific requirements of various projects and integrated seamlessly into different production environments.

The one or more machine-learned models in the system take one or more inputs that may include, for example, one or more of the following.

3D Mesh Input, which may include the geometric data of the 3D object, which may include vertex positions, edges, faces, and UV mapping information necessary for texturing.

Text Prompts, which may include descriptive phrases or keywords that specify the desired material properties such as "rusty metal," "polished wood," or "rough stone." These prompts guide the model in generating textures that match the user's intent.

Additional Contextual Data, if applicable), which may include lighting conditions, environmental settings, or any other relevant information that can influence the appearance of the material under different scenarios.

The outputs of the machine-learned model may consist of one or more of the following.

Material Parameters, which may include a set of PBR material parameters such as base color, metallic, roughness, and possibly others like specular, emissive, and normal maps. These parameters define how the material interacts with light and are essential for achieving photorealistic rendering.

Texture Maps, which may include one or more image files corresponding to the material parameters, which can be directly applied to the 3D mesh. These may include diffuse/albedo maps, metallic maps, roughness maps, and normal maps.

Training of the one or more machine-learned model may include one or more of the following steps.

Dataset Compilation. A comprehensive dataset of 3D objects with associated PBR textures may be compiled. Each object in the dataset may be annotated with metadata that describes its material properties and/or other relevant attributes.

Preprocessing. The dataset may be preprocessed to normalize the data, which may include scaling the texture images, converting them to a consistent format, and/or encoding the text prompts.

Feature Extraction. The model may learn to extract features from both the geometric data of the 3D meshes and the descriptive text prompts. This may involve, for example, using convolutional neural networks (CNNs) for image-based features and natural language processing (NLP) techniques for text-based features.

Model Architecture. A neural network architecture suitable for the task may be selected or designed. This architecture could include a generative model, such as a Generative Adversarial Network (GAN), or a Variational Autoencoder (VAE), which are capable of generating high-quality image data.

In example embodiments, the model is trained using the prepared dataset. During training, the model learns the correlation between the input features and the corresponding PBR textures. The training involves adjusting the model's parameters to minimize the difference between the generated textures and the ground truth textures in the dataset.

If the model includes a cross-domain attention module, it may be trained to link the PBR material properties with a pre-trained RGB model. This module helps the system to leverage the rich feature representations of pre-trained models while ensuring the generated textures are consistent with PBR principles.

In example embodiments, the model's performance is validated using a separate set of data not seen during training. Based on the validation results, the model may be fine-tuned to improve its accuracy and generalization capabilities.

The model may be updated continuously with new data to refine its ability to generate PBR textures for a wider variety of materials and conditions.

In this way, the machine-learned model becomes capable of generating PBR textures that can be applied to 3D objects, resulting in realistic materials that respond appropriately to changes in lighting and environmental conditions (e.g., within a rendering engine or game engine).

In example embodiments, the system employs diffusion models, which are a type of generative model that can produce high-quality images. These models work by gradually transforming a random noise distribution into a structured image over a series of steps, akin to reversing a diffusion process.

The diffusion model may be trained on a dataset of images that represent PBR textures. During training, the model learns the distribution of the dataset and how to generate new textures that are similar to those in the training set.

In example embodiments, the system uses a novel cross-domain attention module that allows the diffusion model to utilize features from a pre-trained RGB model. This helps in generating textures that are not only visually appealing but also consistent with the underlying PBR material properties.

In example embodiments, to generate a new PBR texture, the system starts with a noise image and progressively refines it using the trained diffusion model. The model applies learned transformations at each step, guided by the input 3D mesh and text prompts, until a detailed and realistic texture is formed.

In example embodiments, the system predicts a set of PBR material parameters, such as base color, metallic, roughness, and normal maps, as part of the diffusion process. These parameters are essential for rendering the material accurately under various lighting conditions.

In example embodiments, the image-based diffusion process is specifically tailored to generate textures that adhere to PBR principles. This means that the textures not only look realistic but also behave correctly when rendered, reflecting light and casting shadows as expected based on their material properties.

In example embodiments, by using image-based diffusion, the system can generate textures that are well-parametrized for 3D rendering, avoiding issues such as photometric inconsistency and ambiguities in inverse rendering that are common with traditional RGB image generation methods.

The image-based diffusion in this system is a sophisticated technique that synthesizes PBR textures by learning from a dataset of existing materials and applying that knowledge to generate new textures that are both visually detailed and physically accurate. This approach is particularly useful for automating the texture generation process in 3D content creation, saving time and resources while ensuring high-quality results.

In example embodiments, the cross-network or cross-domain attention mechanism is a sophisticated component within a machine-learning architecture that enables the system to integrate and leverage information from different domains or feature spaces. In the context of generating PBR textures, this mechanism allows the system to utilize the rich feature representations of pre-trained RGB models to enhance the generation of PBR textures that are consistent with the underlying material properties.

The cross-domain attention mechanism may be configured to align the feature spaces of two parallel networks: one trained on RGB images (RGB-space) and the other focused on PBR textures (PBR-space). This alignment enables the PBR-space network to access and utilize the internal representations of the RGB-space network.

During the diffusion process, the mechanism may facilitate an exchange of information between the RGB and PBR networks. It allows the PBR network to query the RGB network's feature maps and vice versa, effectively creating a bidirectional flow of information.

The mechanism may replace traditional self-attention layers with cross-network attention layers. These layers take the feature maps of both networks as input and output modified features to both networks, which continue processing with these enhanced features.

The cross-network attention layers may be trained from scratch, allowing them to learn the most effective way to integrate features from both domains. The pre-trained RGB model's weights may remain frozen to preserve its rich internal representation, which serves as a strong anchor during training.

The attention mechanism may operate on the principle of queries, keys, and values. In example embodiments, the PBR network generates queries that are matched against keys from the RGB network to retrieve relevant values (features) that are then used to enhance the PBR network's hidden state.

The cross-network attention may involve sharing weights between the RGB and PBR networks' attention layers, ensuring that the learned attention is consistent and applicable across both domains.

During backpropagation, gradients may flow through the attention mechanism, allowing the PBR network to adjust its parameters not only based on its own output but also considering the influence of the RGB network's features.

The attention layers may consist of multi-head attention units that allow the system to focus on different parts of the feature space simultaneously, capturing a more comprehensive representation of the cross-domain features.

The cross-domain attention mechanism may be designed to be computationally efficient while providing significant performance gains. It may leverage the pre-existing knowledge embedded in the RGB network to improve the PBR texture generation without the need for extensive retraining.

By leveraging features from a pre-trained RGB model, the system can generate PBR textures with higher fidelity and photorealistic quality.

The attention mechanism may help ensure that the generated PBR textures are consistent across different lighting conditions, which is crucial for their use in 3D rendering environments.

The mechanism allows for efficient training of the PBR network by utilizing the already learned features of the RGB network, reducing the need for large PBR-specific datasets.

The cross-domain attention enables the PBR network to access a broader and more complex feature set than it could learn on its own, leading to better generalization and creativity in texture generation.

The cross-domain attention significantly enhances the generation of PBR textures by intelligently leveraging and integrating the knowledge from pre-trained RGB models. This mechanism helps the system to produce high-quality, consistent, and realistic textures for use in various 3D content creation workflows.

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 5:
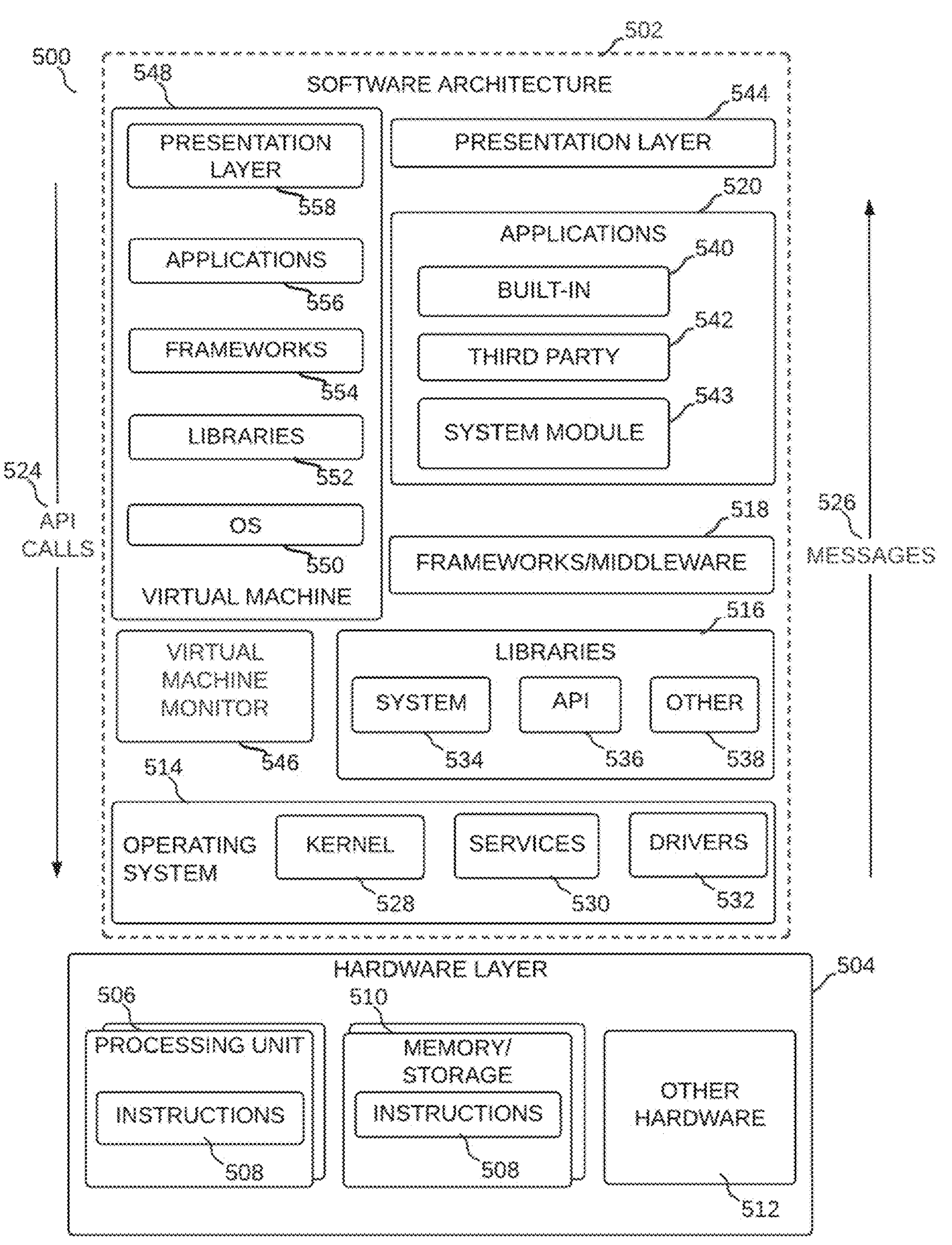
FIG. 5 is a block diagram illustrating an example software architecture, which may be used in conjunction with various hardware architectures described herein, in accordance with one or more example embodiments.

FIG. 5 is a block diagram 500 illustrating an example software architecture 502, which may be used in conjunction with various hardware architectures herein described to provide a gaming engine 501 and/or components of the rendering engine. FIG. 5 is a non-limiting example of a software architecture and it will be appreciated that many other architectures may be implemented to facilitate the functionality described herein. The software architecture 502 may execute on hardware such as a machine 600 of FIG. 6 that includes, among other things, processors 610, memory 630, and input/output (I/O) components 1050. A representative hardware layer 504 is illustrated and can represent, for example, the machine 600 of FIG. 6. The representative hardware layer 504 includes a processing unit 506 having associated executable instructions 508. The executable instructions 508 represent the executable instructions of the software architecture 502, including implementation of the methods, modules and so forth described herein. The hardware layer 504 also includes memory/storage 510, which also includes the executable instructions 508. The hardware layer 504 may also comprise other hardware 512.

In the example architecture of FIG. 5, the software architecture 502 may be conceptualized as a stack of layers where each layer provides particular functionality. For example, the software architecture 502 may include layers such as an operating system 514, libraries 516, frameworks or middleware 518, applications 520 and a presentation layer 544. Operationally, the applications 520 and/or other components within the layers may invoke application programming interface (API) calls 524 through the software stack and receive a response as messages 526. The layers illustrated are representative in nature and not all software architectures have all layers. For example, some mobile or special purpose operating systems may not provide the frameworks/middleware 518, while others may provide such a layer. Other software architectures may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. The drivers 532 may be responsible for controlling or interfacing with the underlying hardware. For instance, the drivers 532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 516 may provide a common infrastructure that may be used by the applications 520 and/or other components and/or layers. The libraries 516 typically provide functionality that allows other software modules to perform tasks in an easier fashion than to interface directly with the underlying operating system 514 functionality (e.g., kernel 528, services 530 and/or drivers 532). The libraries 616 may include system libraries 534 (e.g., C standard library) that may provide functions such as memory allocation functions, string manipulation functions, mathematic functions, and the like. In addition, the libraries 516 may include API libraries 536 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 516 may also include a wide variety of other libraries 538 to provide many other APIs to the applications 520 and other software components/modules.

The frameworks 518 (also sometimes referred to as middleware) provide a higher-level common infrastructure that may be used by the applications 520 and/or other software components/modules. For example, the frameworks/middleware 518 may provide various graphic user interface (GUI) functions, high-level resource management, high-level location services, and so forth. The frameworks/middleware 518 may provide a broad spectrum of other APIs that may be utilized by the applications 520 and/or other software components/modules, some of which may be specific to a particular operating system or platform.

The applications 520 include built-in applications 540 and/or third-party applications 542. Examples of representative built-in applications 540 may include, but are not limited to, a contacts application, a browser application, a book reader application, a location application, a media application, a messaging application, and/or a game application. Third-party applications 542 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 542 may invoke the API calls 524 provided by the mobile operating system such as operating system 514 to facilitate functionality described herein. In example embodiments, the applications 520 may include a rendering module 543. In example embodiments, any of the operations described herein, such as the operations described with respect to FIGS. 1-4, may be implemented by the rendering module 543.

The applications 520 may use built-in operating system functions (e.g., kernel 528, services 530 and/or drivers 532), libraries 516, or frameworks/middleware 518 to create user interfaces to interact with users of the system. Alternatively, or additionally, in some systems, interactions with a user may occur through a presentation layer, such as the presentation layer 544. In these systems, the application/module "logic" can be separated from the aspects of the application/module that interact with a user.

Some software architectures use virtual machines. In the example of FIG. 5, this is illustrated by a virtual machine 548. The virtual machine 548 creates a software environment where applications/modules can execute as if they were executing on a hardware machine (such as the machine 600 of FIG. 6, for example). The virtual machine 548 is hosted by a host operating system (e.g., operating system 514) and typically, although not always, has a virtual machine monitor 546, which manages the operation of the virtual machine 548 as well as the interface with the host operating system (i.e., operating system 514). A software architecture executes within the virtual machine 548 such as an operating system (OS) 550, libraries 552, frameworks 554, applications 556, and/or a presentation layer 558. These layers of software architecture executing within the virtual machine 548 can be the same as corresponding layers previously described or may be different.

Figure 6:
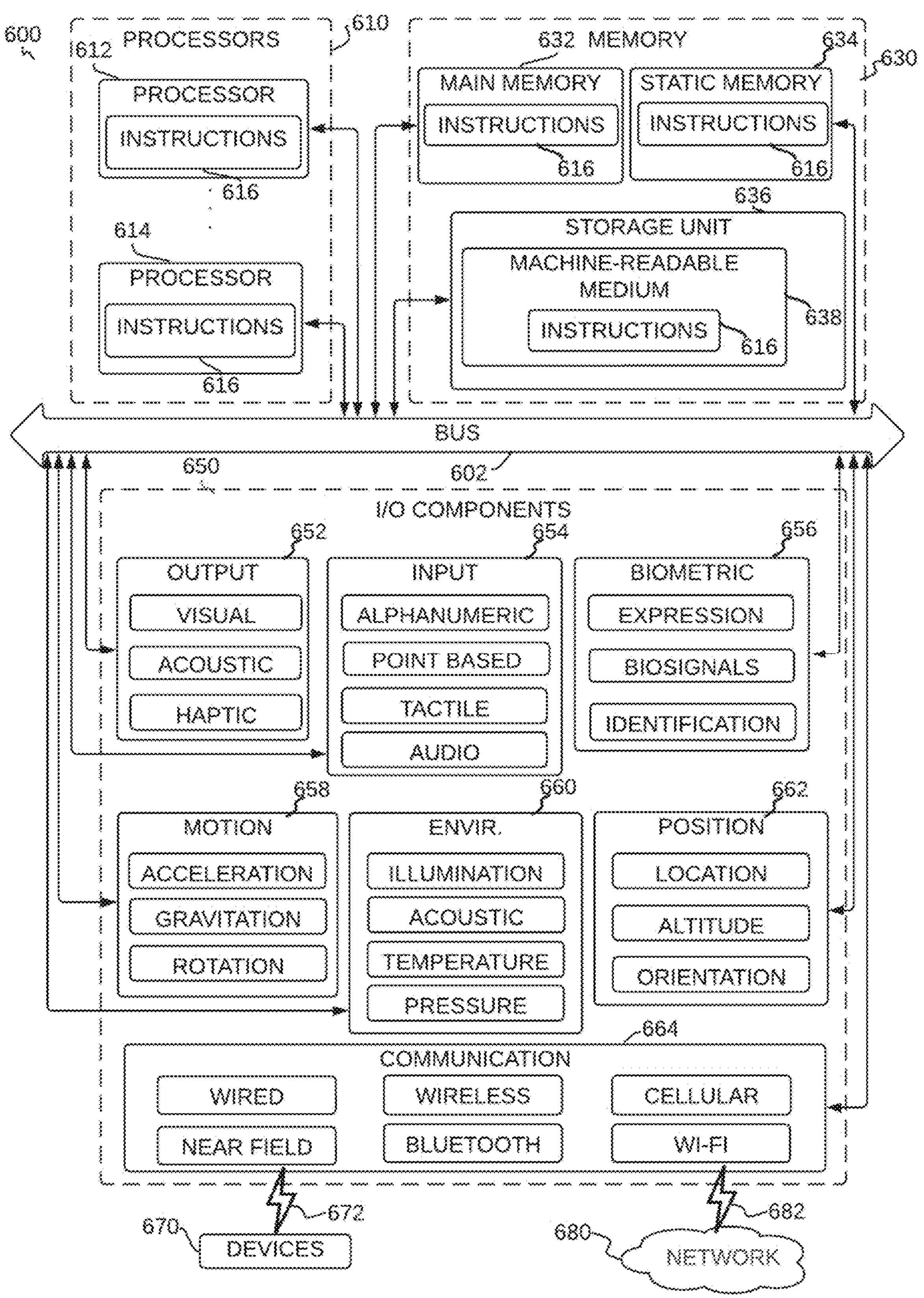
FIG. 6 is a block diagram illustrating components of a machine, according to some example embodiments, configured to read instructions from a machine-readable medium (e.g., a machine-readable storage medium) and perform any one or more of the methodologies discussed herein, in accordance with one or more example embodiments.

FIG. 6 is a block diagram illustrating components of a machine 600, according to some example embodiments, configured to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. As such, the instructions 616 may be used to implement modules or components described herein. The instructions transform the general, non-programmed machine into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines that individually or jointly execute the instructions 616 to perform any one or more of the methodologies discussed herein.

The machine 600 may include processors 610, memory 630, and input/output (I/O) components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 612 and a processor 614 that may execute the instructions 616. The term "processor" is intended to include multi-core processor that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core processor), multiple processors with a single core, multiple processors with multiples cores, or any combination thereof.

The memory/storage 630 may include a memory, such as a main memory 632, a static memory 634, or other memory, and a storage unit 636, both accessible to the processors 610 such as via the bus 602. The storage unit 636 and memory 632, 634 store the instructions 616 embodying any one or more of the methodologies or functions described herein. The instructions 616 may also reside, completely or partially, within the memory 632, 634, within the storage unit 636, within at least one of the processors 610 (e.g., within the processor's cache memory), or any suitable combination thereof, during execution thereof by the machine 600. Accordingly, the memory 632, 634, the storage unit 636, and the memory of processors 610 are examples of machine-readable media 638.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 650 may include a wide variety of components to receive input, provide output, produce output, transmit information, exchange information, capture measurements, and so on. The specific input/output (I/O) components 650 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 650 may include many other components that are not shown in FIG. 6. The input/output (I/O) components 650 are grouped according to functionality merely for simplifying the following discussion and the grouping is in no way limiting. In various example embodiments, the input/output (I/O) components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 650 may include communication components 664 operable to couple the machine 600 to a network 680 or devices 670 via a coupling 682 and a coupling 672 respectively. For example, the communication components 664 may include a network interface component or other suitable device to interface with the network 680. In further examples, the communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 662, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The term 'content' used throughout the description herein should be understood to include all forms of media content items, including images, videos, audio, text, 3D models (e.g., including textures, materials, meshes, and more), animations, vector graphics, and the like.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D simulation environments, 2D content creation environments, and the like), 3D digital environments (e.g., 3D game environments, 3D simulation environments, 3D content creation environments, virtual reality environments, and the like), and augmented reality environments that include both a digital (e.g., virtual) component and a real-world component.

The term 'digital object', used throughout the description herein is understood to include any object of digital nature, digital structure or digital element within an environment. A digital object can represent (e.g., in a corresponding data structure) almost anything within the environment; including 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'digital object' may also be understood to include linked groups of individual digital objects. A digital object is associated with data that describes properties and behavior for the object.

The terms 'asset', 'game asset', and 'digital asset', used throughout the description herein are understood to include any data that can be used to describe a digital object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more digital objects within a game at runtime (e.g., during execution of the game).

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

We claim:

1. A system comprising:

one or more computer processors;

one or more computer memories;

a set of instructions incorporated into the one or more computer memories, the set of instructions configuring the one or more computer processors to perform operations, the operations comprising:

receiving a 3D mesh input;

receiving one or more text prompts associated with the 3D mesh input;

inputting the 3D mesh input and the one or more text prompts into a trained machine-learning model, wherein the trained machine-learning model includes a cross-domain attention mechanism that aligns the feature spaces of a plurality of parallel networks, the plurality of parallel networks including a red, green, blue (RGB) space trained on RGB images and a physically-based rendering (PBR) trained on PBR textures; and receiving output data from the trained machine-learning model, the output data comprising material and texture information, wherein the material and texture information enables rendered views of a 3D mesh with the output data to respond to changes in lighting in a real-time 3D rendering environment.

2. The system of claim 1, further comprising applying the output data to the 3D mesh input for use in a real-time 3D rendering environment.

3. The system of claim 1, wherein the trained machine-learning model comprises an artificial intelligence model trained using a dataset of annotated 3D objects.

4. The system of claim 3, wherein the dataset of annotated 3D objects includes a variety of view-independent material properties suitable for multi-view fusion in 3D software applications.

5. The system of claim 1, wherein the output data further comprises a set of material parameters including at least a base color, metallic property, and roughness property, which are used by a 3D rendering application to simulate realistic lighting interactions.

6. The system of claim 5, wherein the set of material parameters further includes a normal map that encodes small geometric details to increase realism during rendering, the normal map being defined in a geometry tangent space normal map to ensure consistency across texture atlas unwrapping.

7. A non-transitory computer-readable storage medium storing a set of instructions that, when executed by one or more computer processors, causes the one or more computer processors to perform operations, the operations comprising:

receiving a 3D mesh input;

receiving one or more text prompts associated with the 3D mesh input;

inputting the 3D mesh input and the one or more text prompts into a trained machine-learning model, wherein the trained machine-learning model includes a cross-domain attention mechanism that aligns the feature spaces of a plurality of parallel networks, the plurality of parallel networks including a red, green, blue (RGB) space trained on RGB images and a physically-based rendering (PBR) trained on PBR textures; and receiving output data from the trained machine-learning model, the output data comprising material and texture information, wherein the material and texture information enables rendered views of a 3D mesh with the output data to respond to changes in lighting in a real-time 3D rendering environment.

8. The non-transitory computer-readable storage medium of claim 7, further comprising applying the output data to the 3D mesh input for use in a real-time 3D rendering environment.

9. The non-transitory computer-readable storage medium of claim 7, wherein the trained machine-learning model comprises an artificial intelligence model trained using a dataset of annotated 3D objects.

10. The non-transitory computer-readable storage medium of claim 9, wherein the dataset of annotated 3D objects includes a variety of view-independent material properties suitable for multi-view fusion in 3D software applications.

11. The non-transitory computer-readable storage medium of claim 7, wherein the output data further comprises a set of material parameters including at least a base color, metallic property, and roughness property, which are used by a 3D rendering application to simulate realistic lighting interactions.

12. The non-transitory computer-readable storage medium of claim 11, wherein the set of material parameters further includes a normal map that encodes small geometric details to increase realism during rendering, the normal map being defined in a geometry tangent space normal map to ensure consistency across texture atlas unwrapping.

13. A method comprising:

receiving a 3D mesh input;

receiving one or more text prompts associated with the 3D mesh input;

inputting the 3D mesh input and the one or more text prompts into a trained machine-learning model, wherein the trained machine-learning model includes a cross-domain attention mechanism that aligns the feature spaces of a plurality of parallel networks, the plurality of parallel networks including a red, green, blue (RGB) space trained on RGB images and a physically-based rendering (PBR) trained on PBR textures; and receiving output data from the trained machine-learning model, the output data comprising material and texture information, wherein the material and texture information enables rendered views of a 3D mesh with the output data to respond to changes in lighting in a real-time 3D rendering environment.

14. The method of claim 13, further comprising applying the output data to the 3D mesh input for use in a real-time 3D rendering environment.

15. The method of claim 13, wherein the trained machine-learning model comprises an artificial intelligence model trained using a dataset of annotated 3D objects.

16. The method of claim 15, wherein the dataset of annotated 3D objects includes a variety of view-independent material properties suitable for multi-view fusion in 3D software applications.

17. The method of claim 13, wherein the output data further comprises a set of material parameters including at least a base color, metallic property, and roughness property, which are used by a 3D rendering application to simulate realistic lighting interactions.

* * * * *